United States Patent [19]

Ikeuchi et al.

[11] Patent Number: 4,823,248
[45] Date of Patent: Apr. 18, 1989

[54] HIGH VOLTAGE GENERATOR

[75] Inventors: Hiroshi Ikeuchi; Nobuaki Imamura, both of Nagaokakyo, Japan

[73] Assignee: Murata Manufacturing Co., Ltd., Kyoto, Japan

[21] Appl. No.: 177,758

[22] Filed: Apr. 5, 1988

[30] Foreign Application Priority Data

Apr. 7, 1987 [JP] Japan ................................ 62-84956
Nov. 13, 1987 [JP] Japan ............................. 62-286630

[51] Int. Cl.⁴ ........................ H02M 3/335; H04N 5/63
[52] U.S. Cl. ...................................... 363/20; 363/21; 315/411; 358/190
[58] Field of Search ................................ 363/18–21, 363/59–61, 95, 97, 131; 358/190; 315/411

[56] References Cited

U.S. PATENT DOCUMENTS

| | | | |
|---|---|---|---|
| 4,224,659 | 9/1980 | Iguchi | 363/20 |
| 4,246,635 | 1/1981 | Arima | 363/61 X |
| 4,377,842 | 3/1983 | Cambier | 363/20 |
| 4,394,722 | 7/1983 | Nero | 363/61 X |
| 4,524,411 | 6/1985 | Willis | 363/21 |
| 4,531,181 | 7/1985 | Herz et al. | 363/21 |
| 4,546,388 | 10/1985 | Williams, Jr. | 315/411 X |
| 4,611,152 | 9/1986 | Hishiki et al. | 315/411 |
| 4,616,300 | 10/1986 | Santelmann, Jr. | 363/21 |
| 4,635,176 | 1/1987 | Hishiki et al. | 363/21 |
| 4,639,663 | 1/1987 | Ueno et al. | 363/20 X |
| 4,642,744 | 2/1987 | Thomas | 363/21 |
| 4,649,465 | 3/1987 | Kitou et al. | 363/21 |
| 4,665,347 | 5/1987 | Walker et al. | 315/411 |
| 4,689,730 | 8/1987 | Kimura | 363/21 |
| 4,725,936 | 2/1988 | Nakajima et al. | 363/21 |
| 4,727,464 | 2/1988 | Hartmann et al. | 315/411 X |
| 4,728,868 | 3/1988 | Ishikawa et al. | 358/190 X |
| 4,731,565 | 3/1988 | Tagawa et al. | 315/411 |
| 4,739,462 | 4/1988 | Farnsworth et al. | 363/21 |
| 4,747,012 | 5/1988 | Maeba et al. | 363/21 |
| 4,761,728 | 8/1988 | Takahashi | 363/21 |

Primary Examiner—Patrick R. Salce
Assistant Examiner—Emanuel Todd Voeltz
Attorney, Agent, or Firm—Armstrong, Nikaido Marmelstein & Kubovcik

[57] ABSTRACT

High voltage generators are generally arranged to step up flyback pulses from a horizontal deflection circuit by means of a flyback transformer consisting of a primary low voltage coil and a secondary high voltage coil, rectifying the high voltage output through a rectification circuit for application to the anode of a cathode-ray tube. However, such a flyback transformer construction has an inherent drawback that the voltage of the high voltage output is varied by variations in the high voltage output current due to leakage inductance, resulting in load fluctuations. To overcome this problem, the high voltage generator is provided with a tertiary coil for generating an output voltage corresponding to 1/n of the maximum variation of the load fluctuations, a summing control circuit for controlling the rate of the high voltage output to be additively supplied to the secondary coil from the tertiary coil on the basis of a variation detection signal from a high voltage, variation detector circuit which serves to detect the load fluctuations, and a multiplying circuit for multiplying the voltage received from the summing control circuit by n-times for supply to the low voltage end of the secondary coil, thereby stabilizing the voltage of the high voltage output substantially at a constant level irrespective of the variations in the high voltage output current.

8 Claims, 7 Drawing Sheets

HIGH VOLTAGE GENERATOR

BACKGROUND OF THE INVENTION

(1) Field of the Invention

This invention relates to a high voltage generator which is useful, for example, for applying high d.c. voltage to a cathode-ray tube of a television receiver, display or the like.

(2) Description of the Prior Art

Heretofore, the high voltage generators which are generally called "flyback transformers" are categorized into two types by the manner of winding the secondary high voltage coil, namely, into a sectional winding type and a coaxial multilayer winding type. The sectional winding type has the high voltage coil divided into a plural number of winding blocks in the axial direction of a high voltage bobbin, while the latter coaxial multi-layer winding type has the high voltage coil divided into a plural number of winding layers in the radial direction of the high voltage bobbin. The coaxial multi-layer winding type flyback transformer is lately accepted favorably since it can lower the output impedance as a unit in addition to the improvement of the high voltage regulation.

FIGS. 1 to 4 illustrate a prior art high voltage generator using a coaxial multilayer winding type flyback transformer.

Referring first to FIG. 1, the coaxial multilayer winding type flyback transformer which is indicated at 1 has a core 2 which is formed by abuttingly joining a couple of U-shaped members, a low voltage bobbin 3 which is inserted in one leg of the core 2, a primary low voltage coil 4 which is wound in sections on the circumference of the low voltage bobbins 3, a high voltage bobbin 5 which is fitted over the low voltage bobbin 3, a secondary high voltage coil consisting of five winding layers 7A to 7E coaxially wound in multiple layers around the circumference of the high voltage bobbin 5 through an interlay sheet 6, and a high voltage diode 8 consisting of five high voltage diodes 8A to 8E connected in series alternately with the high voltage winding layers 7A to 7E.

Referring to FIG. 2 which shows the general circuit arrangement, the dot "." which is attached to the low voltage coil 4 and the respective high voltage winding layers 7A to 7E indicates a winding end. The high voltage end of the primary coil 4 is connected to a horizontal deflecting circuit 9. The just-mentioned horizontal deflecting circuit 9 is composed of a horizontal output transistor 10 consisting of an NPN type transistor, a damper diode 11, a resonant capacitor 12, a horizontal deflecting coil 13 of a deflecting yoke, and an S-shaped correcting capacitor 14. The collector of the transistor 10 is connected to the high voltage end of the primary coil 4, and the emitter is grounded. The low voltage end of the primary low voltage coil 4 is connected to a flyback power supply 15 which applies a d.c. voltage thereto.

On the other hand, the high voltage coil 7 has its high voltage winding layer 7A at the lowest voltage end connected to an ABL (automatic brightness limiter) or to the ground. The high voltage winding layer 7E at the highest voltage end is connected to the anode terminal 17A of a cathode-ray tube 17 via output high voltage diode 8E and a high voltage cable 16. Indicated at 18 is a fixed resistor on the side of the high voltage output end, and at 19 is a focus volume resistor, which are connected in series between the high voltage output end of the high voltage coil 7 and the ground.

With the high voltage generator of the above-described arrangement, as a basic pulse is applied to the base of the transistor 10 from a horizontal drive circuit (not shown), a collector pulse (flyback pulse) of the collector of the transistor 10 is fed to the low voltage coil 4. As a result, high voltages are induced in the respective winding layers 7A to 7E of the secondary coil 7 according to the number of coil turns, and these high voltages are summed up and rectified through the high voltage diodes 8A and 8E, producing a d.c. high voltage output with a voltage $E_H$ and a current $I_H$ at the high voltage diode 8E as shown in FIG. 3 for supply to the cathode-ray tube 17.

In a case where the flyback transformer 1 has coaxial multiple layer windings as shown in FIG. 1, each with the same number of turns, the potentials between the respective winding layers 7A to 7E become zero a.c.-wise and have the same output waveform. Accordingly, the winding layers 7A to 7E require only an insulation treatment for the d.c. potential difference, and the interlay sheet 6 may be of an extremely small thickness.

On the other hand, a voltage $e_H$ which is expressed by the following equation is produced in the respective winding layers 7A to 7E.

$$e_H = \Delta e_H \times N_H \quad (1)$$

wherein $\Delta e_H$ is the voltage which is generated per turn of the winding and $N_H$ is the number of turns of the winding layers 7A to 7E. Therefore, the a.c. through voltage endurance for the distance L (see FIG. 1) between the high voltage end of the winding layer 7A on the lowest voltage side and the primary low voltage coil 4 becomes $e_{H1}$ when the a.c. voltage endurance of the primary coil 4 is ignored, namely, the distance L requires a material and a distance which can endure the voltage $e_{H1}$. However, in a case where the secondary high voltage coil 7 is divided into five layers, $e_H \div 5.4$ kV and the distance L takes a small value even if the voltage $E_H$ of the high voltage output is set at 27 kV.

It follows that the finish outer diameter R of the outermost winding layer 7E of the flyback transformer can be minimized, as a result reducing the leakage inductance of the secondary coil 7. Therefore, when the flyback transformer is of the coaxial multilayer winding type as shown in FIG. 1, the high voltage output has the characteristics as indicated at (a) of FIG. 3, with the voltage drop minimized correspondingly to the reduction of the leakage inductance in contrast to the characteristics (b) of the sectional winding type.

In order to cope with another problem of a large variation which occurs to the high voltage output current $I_H$ in the range of 0–200 µA, the fixed resistor 18 and focus volume resistor 19 are inserted in series between the high voltage output terminal and the ground to shunt part of the high voltage output current $I_H$ for improving the high voltage variation and obtaining the characteristics as shown at (c) of FIG. 4. Since the loss will become larger if the resistors 18 and 19 are too small in resistance, current $i_H$ which corresponds to about 10% of the high voltage output current $I_H$ is normally shunted. Energy of 2.6 W is wasted as a loss when current $i_H = 100$ µA is passed through the resistors 18 and 19 with a resistance of 260 MΩ in total.

Accordingly, assuming that the output impedance of the characteristics (a) of FIG. 3 is $Z_{01}$, it is expressed as $$Z_{01} = \frac{(27 - 25)\text{kV}}{1000 \, \mu A} = 2M\Omega \quad (2)$$

On the other hand, assuming that the output impedance of the characteristics (c) of FIG. 4 is $Z_{02}$, it is expressed as $$Z_{02} = \frac{(26.1 - 24.9)\text{kV}}{1000 \, \mu A} \approx 1.2 \, M\Omega \quad (3)$$

showing a conspicuous improvement.

Thus, the above-described prior art contemplated to improve the high voltage regulation by lowering the output impedance through improvement of the characteristics of the flyback transformer 1 as a whole. However, the output impedance of the flyback transformer 1 as a unit has a limitation at about 1.2 M$\Omega$, finding a difficulty in responding to the severe requirements of recent display devices.

Namely, in the characteristics (c) of FIG. 4, the voltage drop $\Delta E_H$ due to the variation of the high voltage current $I_H$ in the range of 0–1000 $\mu A$ is $$\Delta E_H = 1000 \, \mu A \times 1.2 \, M\Omega = 1.2 \, \text{kV} \quad (4)$$

Generally, the high voltage regulation Re is expressed as $$Re = \frac{\Delta E_H}{E_{Hm}} \times 100\% \quad (5)$$

In the case of the particular example given above, the high voltage regulation Re is $$Re = \frac{1.2 \, \text{kV} \times 100}{(26.1 - 1.2)\text{kV}} = 4.8\% \quad (6)$$

thus corresponding to a variance of 4.8%. Consequently, it is necessary to reduce this variance in order to obtain pictures of high quality.

SUMMARY OF THE INVENTION

It is an object of the present invention to eliminate the above-discussed problems of the prior art, more specifically to provide a high voltage generator which is adapted to suppress the variation in high output voltage due to the variation in the high voltage output current, namely, to suppress high voltage load fluctuations, stabilizing the voltage of the high voltage output at a predetermined value.

It is another object of the invention to provide a high voltage generator which is provided with a tertiary coil magnetically coupled with the primary low voltage coil of the flyback transformer, and which is arranged to deliver the output voltage induced in the tertiary coil according to the extent of the high voltage load variation, and to add the delivered output voltage to the low voltage side of the secondary high voltage coil, thereby stabilizing the voltage of the high voltage output.

It is still another object of the invention to provide a high voltage generator which is arranged to induce in a tertiary coil, which is magnetically coupled with the low voltage coil of the flyback transformer, an output voltage corresponding to 1/n (n=an integer) of the extent of the high voltage load variation, delivering the output voltage induced in the tertiary coil according to the extent of the high voltage load variation, and adding the delivered output voltage to the low voltage side of the secondary coil after multiplying same by n-times through a multiplying circuit, thereby stabilizing the voltage of the high voltage output and permitting to employ a transistor of low voltage endurance in the generator circuit.

It is a further object of the invention to provide a high voltage generator which is adapted to stabilize the high output voltage irrespective of variations in the current of the high voltage output, thereby lowering the output impedance to a considerable degree to improve the high voltage regulation markedly for securing pictures of high quality for the television receiver.

In accordance with the present invention, the above-mentioned objects are achieved by the provision of a high voltage generator wherein the flyback pulse from a horizontal deflection circuit is stepped up by a flyback transformer consisting of a primary and a secondary coil, and the resulting high voltage output is supplied to the anode of a cathode-ray tube through a rectification circuit, the high voltage generator comprising:

a tertiary coil magnetically coupled with the low voltage coil and adapted to generate an output voltage substantially corresponding to 1/n (n =an integer) of a variation in the high output voltage caused by a maximum variation in a variable range of the high voltage output current of the secondary high voltage coil;

a high voltage output variation detector circuit adapted to detect the variation in the high voltage output to be supplied to the anode of the cathode-ray tube from the high voltage coil;

a summing control circuit adapted to control the rate of the output voltage to be additively supplied to the secondary coil from the tertiary coil on the basis of a variation detection signal from the high voltage output variation detector circuit; and a multiplying circuit adapted to multiply an input voltage from the summing control circuit substantially by n-times for supply to the low voltage end of the secondary coil.

BRIEF DESCRIPTION OF THE DRAWINGS

The above and other objects, features and advantages of the invention will become apparent from the following description and the appended claims, taken in conjunction with the accompanying drawings, wherein:

FIGS. 1 to 4 illustrate an example of the prior art, of which:

FIG. 1 is a longitudinal section of a coaxial multilayer winding type flyback transformer;

FIG. 2 is a circuit diagram of a conventional high voltage generator circuit;

FIG. 3 is a current-voltage characteristics diagram of high voltage output of the coaxial multilayer winding type flyback transformer and the sectional winding type flyback transformer; and FIG. 4 is a current-voltage characteristics diagram of the high voltage output in a case where a fixed resistor and a focus volume resistor are inserted between the high voltage output end and the ground for improvement of the high voltage variation;

FIGS. 5 to 8 illustrate a first embodiment of the present invention, of which:

FIG. 5 is a circuit diagram of the first embodiment;

FIG. 6 is an output voltage characteristics diagram of the tertiary coil;

FIG. 7 is a voltage waveform diagram of the d.c. output voltage applied to the lowest voltage end of the secondary coil from a smoothing circuit;

FIG. 7(A) is a voltage waveform when the high voltage output current $I_H=0$;

FIG. 7(B) is a voltage waveform when the high voltage output current $I_H=$medium;

FIG. 7(C) is a voltage waveform when the high voltage output current $I_H=$maximum; and FIG. 8 is a current-voltage waveform diagram of the high voltage output obtained by the embodiment of the invention;

DESCRIPTION OF PREFERRED EMBODIMENTS

Figure 1:
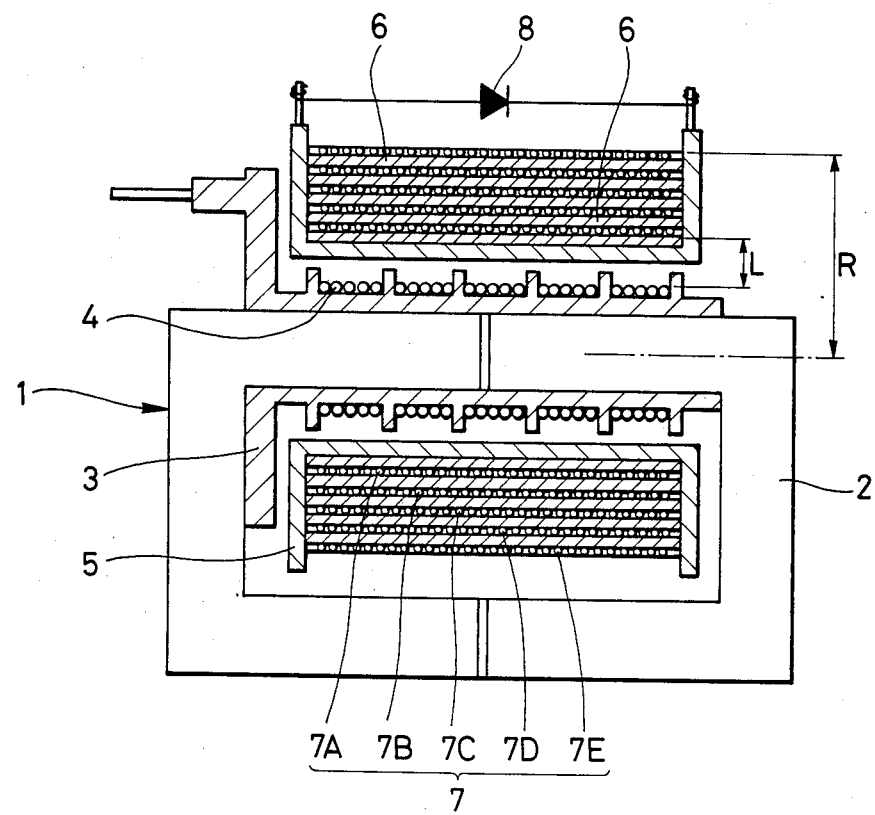
Figure 2:
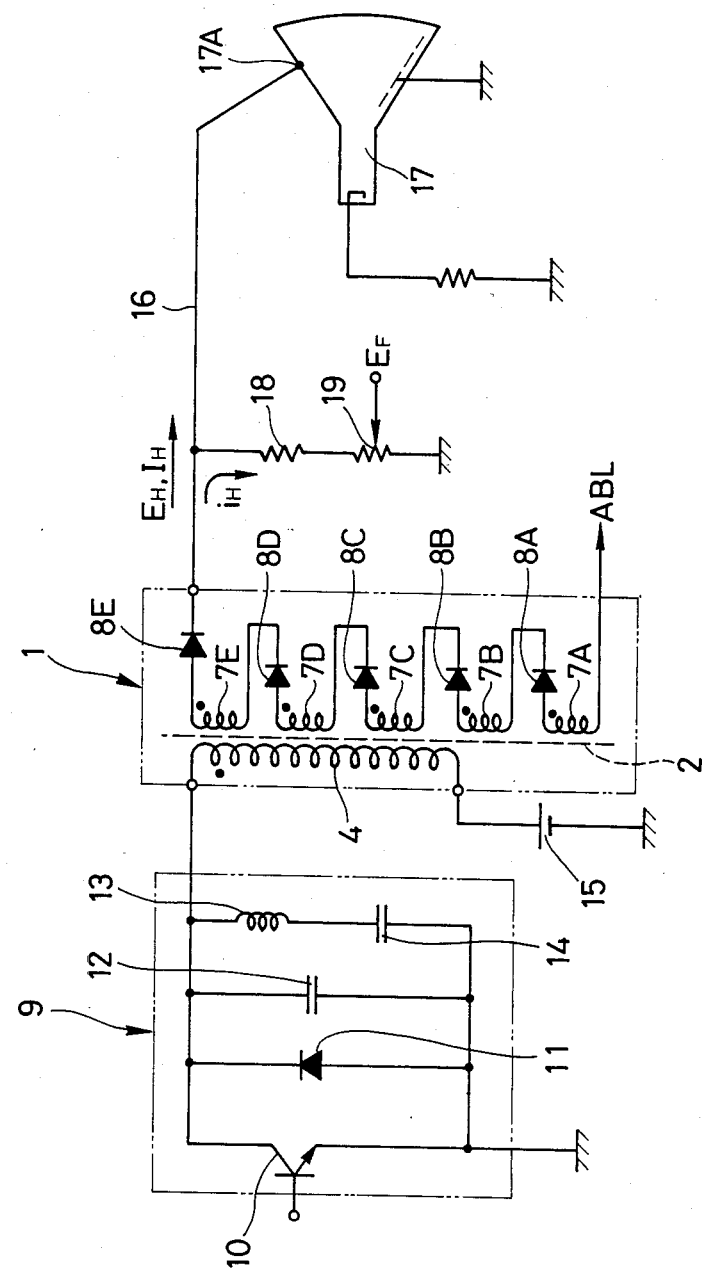
Figure 3:
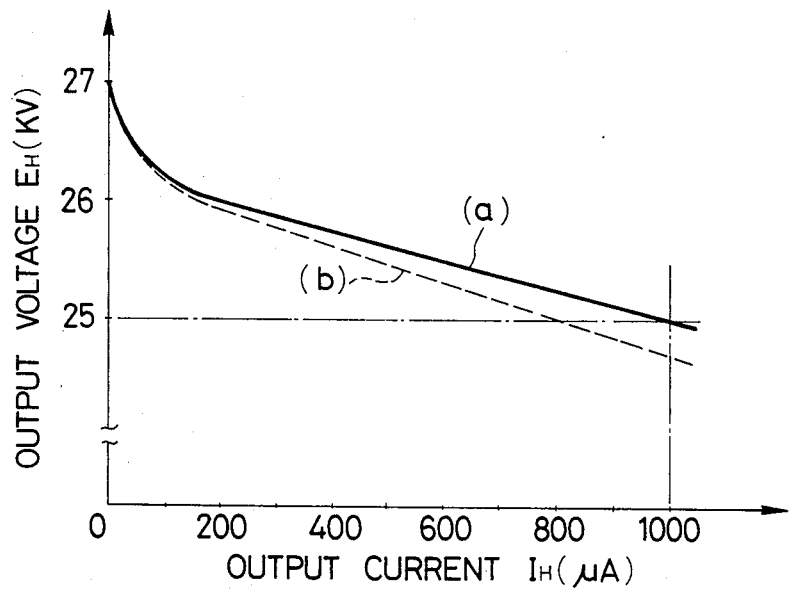
Figure 4:
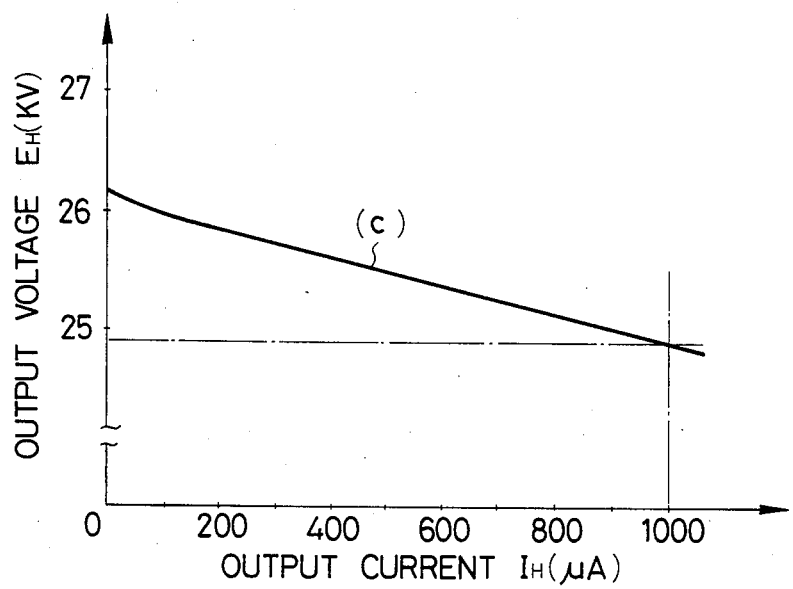

Hereafter, the invention is described more particularly with reference to FIGS. 5 to 10. In the following description, the component parts which are common to the above-described conventional device are designated by common reference numerals and their description is omitted to avoid unnecessary repetitions.

Figure 5:
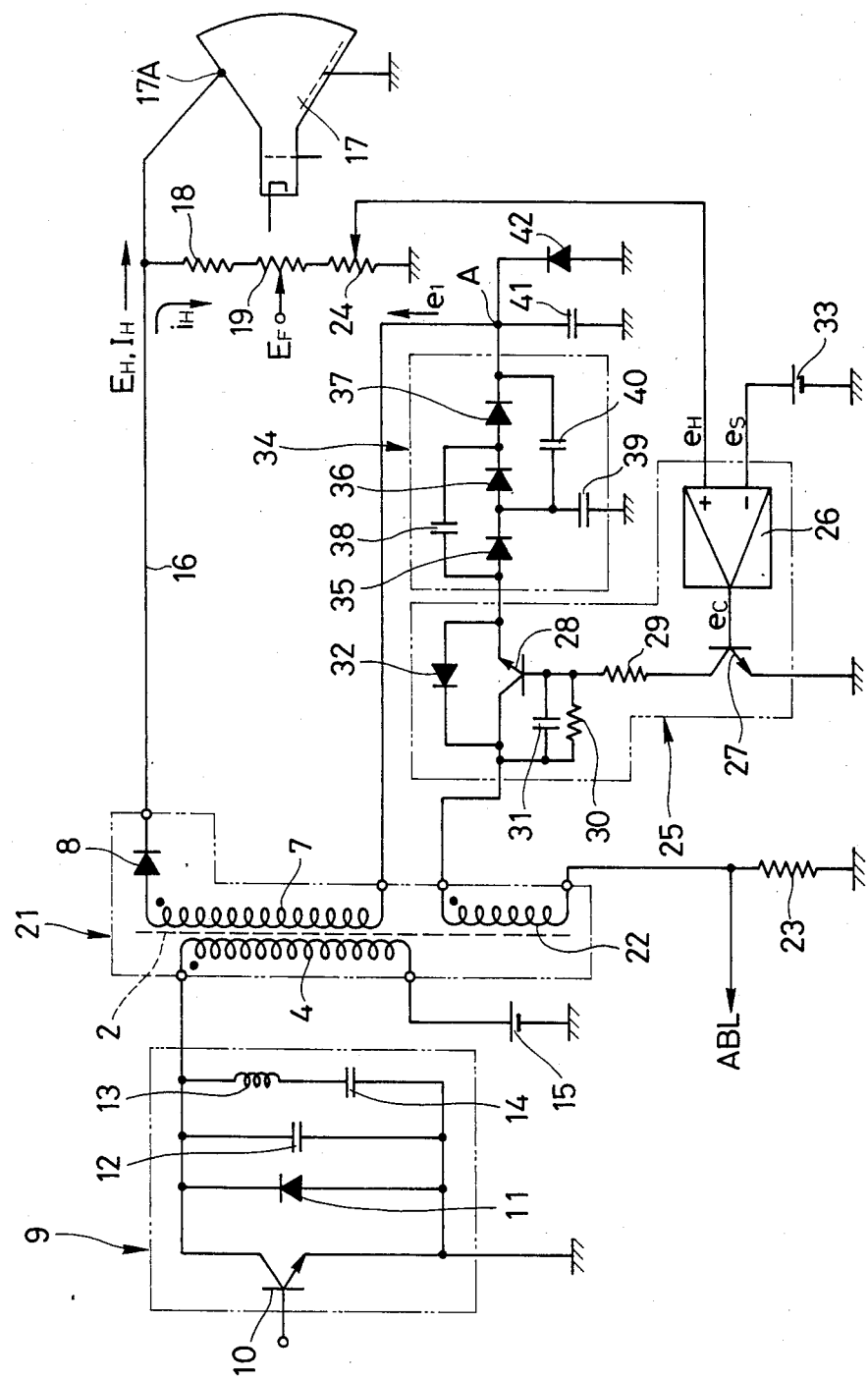

Referring first to FIGS. 5 to 8, there is shown a first embodiment of the invention, in which indicated at 21 is a coaxial multilayer winding type flyback transformer employed in this embodiment and, similarly to the conventional counterpart, constituted by a core 2, a primary coil 4, a secondary coil 7, a high voltage diode 8 and the like. (The secondary coil 7 and the high voltage diode 8 of FIG. 5 are omitted for simplicity of illustration.) However, this embodiment differs in that a tertiary coil 22 is wound around low voltage bobbin 3 in an innermost or outermost position along with the primary coil 4.

Figure 6:
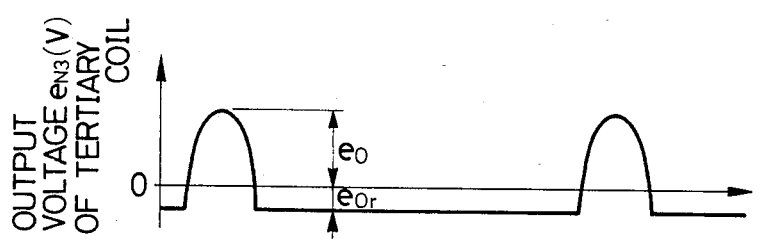
Figure 7:
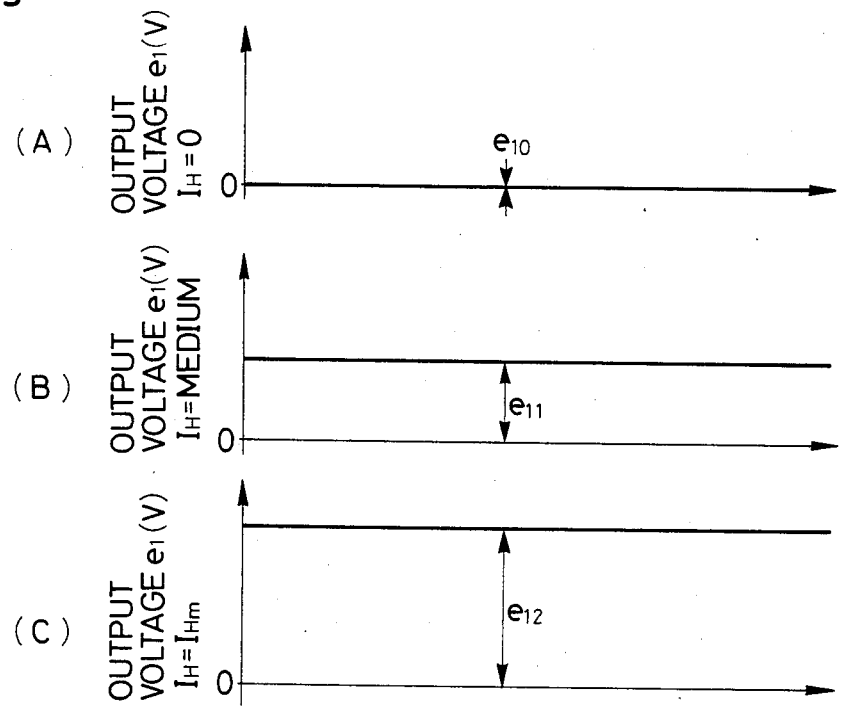

In this instance, the tertiary coil 22 generates a pulse voltage expressed by the following equation by magnetically coupling with the low voltage coil 4.

$$e_{N3} = \Delta e_H \times N_3 \quad (7)$$

wherein $N_3$ is the number of turns of the coil 22. This output voltage $e_{N3}$ has a waveform as shown in FIG. 6, having a positive portion $e_0$ and a negative portion $e_{0r}$. This positive portion $e_0$ of the output voltage $e_{N3}$ of the tertiary coil 22 is set at a value corresponding to $1/n$ ($n=$an integer) of the variation in high output voltage $E_H$ when the high voltage output current $I_H$ is varied to the maximum value in a variable range, for example, in a range of 0–1000 $\mu$A, namely, to $1/n$ of the variation $\Delta E_H=1.2$ kV (in this particular example, substantially equal to $\frac{1}{2}$ of the high output voltage variation). The low voltage end of the tertiary coil 22 is connected to the ground through a resistor 23 for picking up ABL signal and to an ABL circuit, while its high voltage end is connected in series to the lowest voltage end of the secondary coil 7 through a summing control circuit 25 and a multiplying circuit 34 which will be described hereinafter.

Denoted at 24 is a variable resistor for detection of the voltage variation, constituting the high voltage output variation detector circuit of this embodiment. The variable resistor 24 is connected between the high voltage output end of the secondary coil 7 and the ground in series with the fixed resistor 18 and the focus volume resistor 19, the variable resistor 24 producing a detected voltage $e_H$ at its sliding end according to the variation of the high output voltage $E_H$ for supply to a non-inverting input terminal of an error amplifier 26 which will be described hereinafter.

Indicated at 25 is a summing control circuit which constitutes a summing control means of this embodiment, and which includes an error amplifier 26 consisting of a differential amplifier or the like, first and second NPN type transistors 27 and 28, first and second resistors 29 and 30, a capacitor 31 and a diode 32. The inverting input terminal of the error amplifier 26 is connected to a reference power supply 33 which supplies a reference voltage $e_S$, while its non-inverting input terminal is connected to the variable resistor 24. The output terminal of the amplifier 26 is connected to the base of the transistor 27. The emitter of the transistor 7 is grounded, while its collector is connected to the base of the transistor 28 through the resistor 29. Further, the collector of the transistor 27 is connected to the high voltage end of the tertiary coil 22, resistor 30, one end of the capacitor 31 and the cathode of the diode 2, while its base is connected to the resistor 30 and the other end of the capacitor 31, with the emitter connected to the anode of the diode 32 and the multiplying circuit 34 which will be described hereinafter.

The error amplifier 26 is supplied with voltages $e_H$ and $e_S$ from the variable resistor 24 and reference power supply 33. The variable resistor 24 is adjusted such that the detected voltage $e_H$ becomes the lowest voltage $e_{H1}$ when the high voltage output current $I_H$ takes the maximum value $I_{Hm}$.

$$e_{H1} = E_S \quad (8)$$

Further, the first resistor 29 serves as a current protecting resistor for the first transistor 27, and the second resistor 30 produces the base voltage of the transistor 28 and has an extremely large value of resistance as compared with the resistor 29. On the other hand, the capacitor 31 is a phase advancing capacitor which is provided depending upon the necessity. Further, the diode 32 is an inversing diode which is also provided if necessary for inversely flowing the negative portion $e_{0r}$ of the output voltage $e_{N3}$ of the tertiary coil 22 to the ground from the ground on the side of the resistor 23 successively through a capacitor 41, multiplying circuit 34, diode 32 and tertiary coil 22.

The detected voltage $e_H$ to be applied to the error amplifier 26 varies in response to variations in the current $i_H$ shunted from the high voltage cable 16, changing the states of the first and second transistor 27 and 28 accordingly. As a result, the output voltage $e_{N3}$ induced in the tertiary coil 22 is fed to the multiplying circuit 34 from the second transistor 28 according to the variations in the high output voltage $E_H$, and added to the secondary coil 7 from the multiplying circuit 34.

The multiplying circuit 34 is provided in a stage subsequent to the summing control circuit 25 for multiplying the input voltage for n-times, and, in this particular embodiment, it is constituted by first to third diodes 35, 36, 37 and first to third capacitors 38, 39, 40 which are connected in cascade as shown in the drawing to form a doubling circuit. Its input including the anode of the diode 35 and one end of the capacitor 38 is connected to the emitter of the transistor 28, while its output including the cathode of the diode 37 and the other end of the capacitor 40 is connected at a node A to a capacitor 41 and diode 42 which will be described hereinafter and to the lowest voltage end of the secondary coil 7. The capacitor 39 is grounded.

The capacitor 41 is provided between the node A and the ground to constitute a smoothing circuit in this embodiment, for smoothing the doubled output voltage of the multiplying circuit 34 to obtain at the node A a d.c. output voltage $e_1$ as shown in FIG. 5.

In that figure, the reference numeral 42 indicates a diode which provided between the node A and the ground in parallel with the capacitor 41, the diode 42 conducting the lowest voltage end of the secondary coil 7 to the ground when the transistor 28 is cut off, namely, when the d.c. output voltage $e_1$ is zero, to permit flow of the high voltage output current $I_H$.

With the above-described arrangement, this embodiment operates in the following manner.

Firstly, as a collector pulse is applied to the primary coil 4 from the horizontal deflection circuit 9, high voltages are induced in the respective winding layers 7A to 7E of the secondary coil 7 according to Equation (1), while a pulse voltage is generated in the tertiary coil 22 according to Equation (7) to induce a flyback pulse as shown in FIG. 6.

In this state, the adding operation is effected on the high output voltage $E_H$ in relation with variations in the high voltage output current $I_H$ as follows.

In the first place, when the high voltage output current $I_H=0$, the voltage drop due to the output impedance $Z_0$ of the high voltage generator circuit is zero, and the high output voltage $E_H$ is at maximum. Accordingly, the detected voltage $e_H$ which is produced at the sliding end of the variable resistor 24 is of the maximum value $e_{Hm}$, and the error amplifier 26 produces an output voltage $e_C$ (an error signal) of a maximum value to the base of the transistor 27, the transistor 27 is rendered completely conductive, an internal resistance of which is substantially zero. Therefore, in this state, the output voltage which is produced on the high voltage side of the tertiary coil 22 flows to the ground through the resistors 30 and 29 and the first transistor 27, and the second transistor 28 is cut off without supplying the output voltage to its emitter. Consequently, the d.c. output voltage $e_{10}$ at the node A is zero, with the characteristics as shown in FIG. 7(A).

Thus, the low voltage end of the secondary coil 7 is connected only to the ground through the diode 42, so that similarly to the conventional counterpart the high voltages induced in the winding layers 7A to 7E are summed up and rectified through the diodes 8A to 8E $$E_H = \Delta e_H \times \sum_{i=1}^{5} N_{Hi} \qquad (9)$$

generating a high voltage output, for example, a high voltage output of $E_H=26.1$ kV.

Conversely, when the high voltage output current $I_H$ becomes the maximum value of 1000 μA, namely, when $I_H=I_{Hm}$, the voltage drop ($=Z_0 \times I_{Hm}$) of the high output voltage $E_H$ reach the maximum values.

However, in this embodiment, the detected voltage $e_H$ of the variable resistor 24 becomes the lowest voltage $e_{H1}$ when the high voltage output current $I_H$ is maximum, and the reference voltage $e_S$ to the error amplifier 26 is in the relationship expressed by Equation (8). Therefore, in this state the output voltage $e_C$ from the error amplifier 26 to the transistor 27 becomes zero, completely cutting off the transistor 27. As a result, the output voltage from the tertiary coil 22 is fed to the base of the transistor 28 through the resistor 30 to render the transistor 28 conductive.

In this manner, as the second transistor 28 is made conductive completely, the output voltage from the tertiary coil 22 is fed to the multiplying circuit 34 as a flyback pulse as shown in FIG. 6 to multiply same by n (by 2 in the particular embodiment shown), smoothing the multiplied pulse through the capacitor 41 to produce a d.c. output voltage $e_{12}$ at the node A as shown in FIG. 7(C). Of the output voltage $e_{n3}$ produced in the tertiary coil 22, the negative portion is permitted to flow to the ground through a loop consisting of the tertiary coil 22, resistor 23, capacitor 41, the capacitor 40, diode 36 and capacitor 38 of the multiplying circuit 34 and the inverse flow diode 32, substantially without being applied to the secondary coil 7.

Thus, the high output voltage $E_H$ which is produced in the high voltage cable 16 in this embodiment is expressed as $$E_H = \Delta e_H \times \sum_{i=1}^{5} N_{Hi} + e_1 - Z_0 \times I_{Hm} \qquad (10)$$

and therefore, by setting the output voltage of the tertiary coil 22 and the number n of multiplication of the multiplying circuit 34 to satisfy $$e_1 \doteq Z_0 \times I_{Hm} N \times e_0 \qquad (11)$$

(n=2 in this particular embodiment), the voltage drop can be compensated for by the summing control according to Equation (9).

Further, when the high voltage output current $I_H$ is between zero and the maximum value, the output voltage $e_C$ from the error amplifier 26 takes a value which corresponds to the high voltage output current, and the first transistor 27 becomes to have an internal resistance according to the output voltage $e_C$, and the second transistor 28 is rendered conductive below the partial voltage determined by the resistors 30 and 29 and the internal resistance of the first transistor 27. Therefore, in this state the node A has the voltage characteristics as shown in FIG. 7(B). In this case, the voltage drop is also compensated for by the summing control similarly to Equations (10) and (11).

Figure 8:
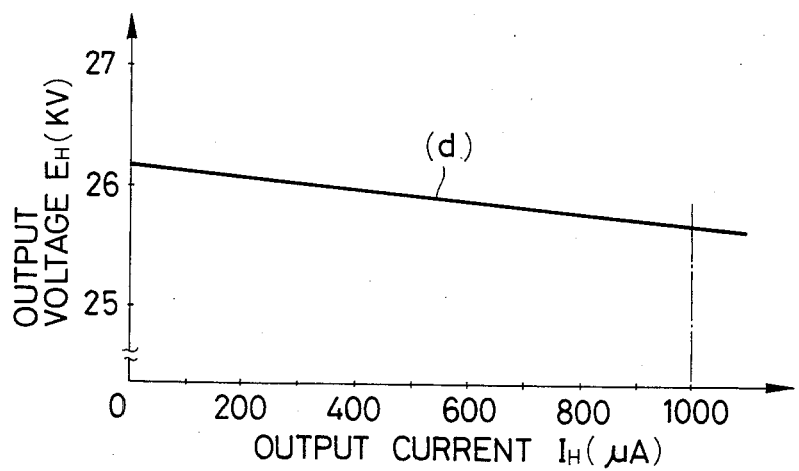

As clear from the foregoing description, this embodiment is adapted to compensate for the voltage drop in the high output voltage by the summing control according to variations in the high voltage output current, so that the characteristics of the high output voltage is extremely stabilized as shown at (d) in FIG. 8, in addition to the improvement of the regulation. Besides, a d.c. output voltage $e_1$ of 1.2–2 kV is normally required in order to stabilize the high output voltage $e_H$, and it is necessary to employ transistors with inverse voltage endurance of 1.2–2 kV for the transistors 27 and 28 to withstand these high voltages unless the multiplying circuit 34 is provided. However, the transistors 27 and 28 of this embodiment are required to have endurance against low voltage corresponding to only 1/n of the afore-mentioned d.c. output voltage $e_1$, and therefore are easily available or manufactured at low cost.

Figure 9:
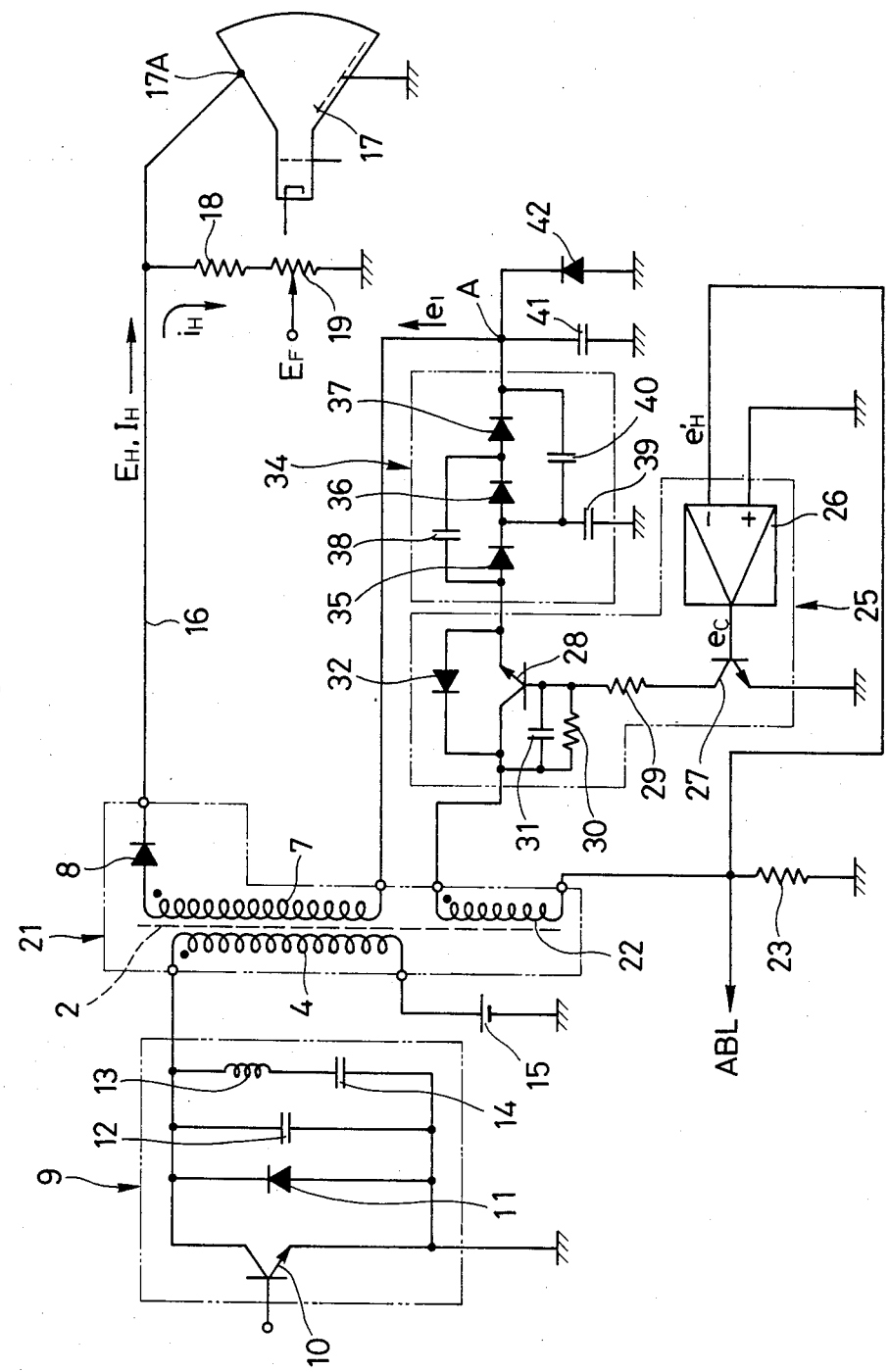
FIG. 9 is a circuit diagram in a second embodiment of the invention.

Referring now to FIG. 9, there is illustrated a second embodiment of the invention, in which the component parts common to the foregoing first embodiment are designated by common reference numerals and their description is omitted to avoid unnecessary repetitions.

The features of this embodiment resides in that the variable resistor 24 of the first embodiment is abolished and the variation in the high voltage output current $I_H$ is drawn out by the use of the resistor 23 for the ABL signal $$e'_H = R_S \times I_H \tag{12}$$

wherein $R_S$ is value of resistor 23, feeding the detected voltage $e'_H$ to the inverting input terminal of the error amplifier 26 with the non-inverting input terminal at the ground potential.

In this embodiment, the high voltage output current $I_H$ flows toward the secondary coil 7 from the resistor 23 and tertiary coil 22. However, when the high voltage output current $I_H$ is zero, the detected voltage $e'_H$ also becomes zero to cut off the transistor 27. Conversely, when the high voltage output current $I_H$ is at the maximum value, the transistor 28 is rendered completely conductive, giving the characteristics as shown in FIG. 8 similarly to the first embodiment.

Figure 10:
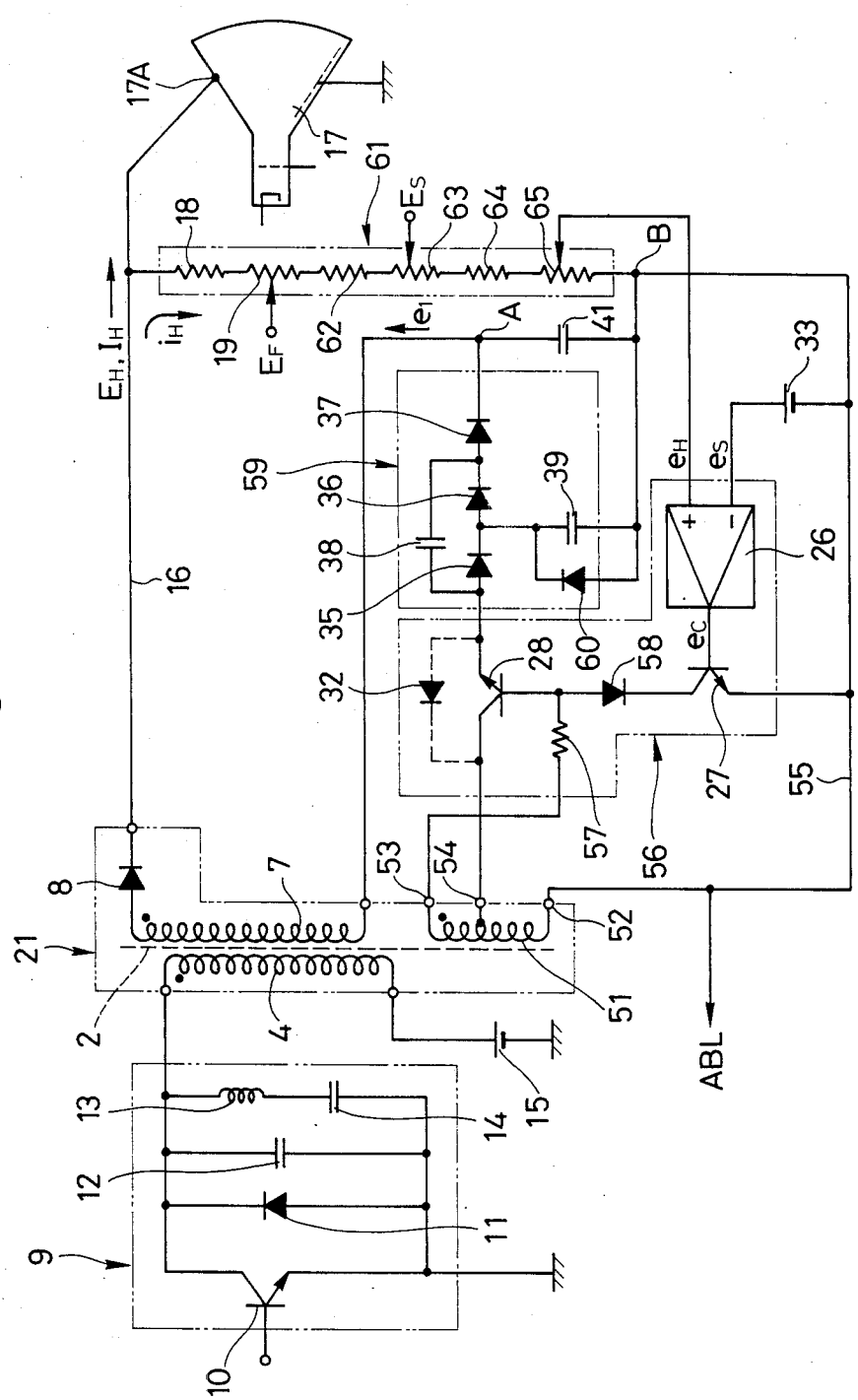
FIG. 10 is a circuit diagram in a third embodiment of the invention.

FIG. 10 illustrates a third embodiment of the invention, in which the component parts common to the above-described first embodiment are designated by common reference numerals and their description is omitted to avoid repetitions.

In FIG. 10, the reference numeral 51 indicates a tertiary coil of this embodiment, which is provided with an intermediate tap between its low voltage end 52 and high voltage end 53 for generating a voltage substantially equal to $1/n$ of the variation $\alpha E_H$ in the high output voltage $E_H$. The low voltage end 52 of the tertiary coil 51 is connected to a reference voltage line 55, while the high voltage end 53 is connected to the base of the transistor 28 through a resistor 57 which will be described hereinafter. The voltage which is produced between the intermediate tap 54 and the high voltage end 53 is capable of supplying a sufficient bias voltage to the transistor 28.

Denoted at 56 is a summing control circuit which includes an error amplifier 26, transistors 27 and 28, a resistor 57 provided between the base of the transistor 28 and the high voltage end of the tertiary coil 51, and a diode 58 provided between the collector of the transistor 27 and the base of the transistor 28. The diode 32 is not required in an ordinary circuit, but may be provided for compensating the action of the transistor 28 when a negative voltage is applied between its emitter and collector.

In this summing control circuit, when the transistor 28 is conducting in a saturated state, the potential between its collector and emitter becomes slight. However, in such a state the high voltage end 53 of the tertiary coil 51 supplies sufficient bias voltage to the transistor 28 to stabilize its operation. Further, when the output voltage $e_C$ is supplied from the error amplifier 26, the degree of conduction of the transistor 27 is deepened according to the magnitude of the output voltage $e_C$. If a negative voltage is produced in the tertiary coil 51 in this state, the diode 58 cuts off the inverse current flow from the emitter to the collector of the transistor 27.

Indicated at 59 is a multiplying circuit of this embodiment, including, in addition to diodes 35, 36, 37 and capacitors 38 and 39, a diode 60 connected to the opposite ends of the capacitor 39. The anode of the diode 60 is connected to the reference voltage line 55 at the node B. When the transistor 28 is turned off, the diode 60 forms a passage for continuously supplying the high voltage output current to the anode terminal 17A of the cathode-ray tube 17.

Designated at 61 is a resistor circuit which is provided between the high voltage cable 16 and the node B of the reference voltage line 55 and which consists of a series circuit including a fixed resistor 18, focus volume resistor 19, fixed resistor 62, screen resistor 63, fixed resistor 64, and a variable resistor 65 for voltage detection. The variable resistor 65 produces a detection voltage $e_H$ according to the variation in the high output voltage $E_H$ for supply to the non-inverting input terminal of the error amplifier 26.

In this embodiment, similarly to the above-described first embodiment, the transistor 28 is in off state when the high voltage output current $I_H$ is zero ($I_H=0$), so that the output voltage of the tertiary coil 54 is not added to the side of the secondary coil 7.

On the other hand, when the high voltage output current $I_H$ increases to the maximum value, the transistor 28 is rendered completely conductive. As a result, a first pulse of $\Delta E_H \times 1/n = e_0$ is produced at the intermediate tap 54 of the tertiary coil 51, charging the capacitor 39 to $e_0$ through the transistor 28. Nextly, in the scanning period a negative voltage $e_{0r}$ is produced in the tertiary coil 51, charging the capacitor 38 to $e_0 + e_{0r}$ through the capacitor 39 and diode 36. Then, a second pulse $e_0$ is produced in the tertiary coil 51, it is added to the charged voltage of the capacitor 38 to charge the capacitor 41 to $2e_0 + e_{0r}$. Consequently, a voltage of $e_1$ ($\div 2e_0$) is supplied to the low voltage end of the secondary coil 7 after smoothing through the capacitor 41 provided between the nodes A and B. The value of the voltage $e_{0r}$ is extremely small.

Although this embodiment employs a coaxial multilayer winding type flyback transformer, the same can be applied to sectional winding type flyback transformers. It should also be understood that the summing control circuit and the multiplying circuit are not limited to the particular circuit arrangements shown. Needless to say, the tertiary coil and the multiplying circuit only need to be in the relationship of $1/n$ and $n$.

As will be appreciated from the foregoing description, the present invention is advantageous in that the high output voltage can be stabilized substantially at a constant value irrespective of variations in the high voltage output current, reducing the output impedance to a marked degree and thereby improving the high voltage regulation considerably to provide pictures of high quality. Another advantage of the invention resides in that the switching control suppresses the loss and that a.c. insulation between the primary coil and the secondary or tertiary coil is easy. A further advantage resides in that it becomes possible to use devices of low voltage endurance for the transistors or the like thanks to the provision of the multiplying circuit.

Although the foregoing description has been directed to preferred forms of the invention, it should be understood that various modifications and alterations can be added thereto without departing from the basic concept of the invention.

What is claimed is:

1. A high voltage generator arranged to step up flyback pulse from a horizontal deflection circuit by means of a flyback transformer consisting of a primary low voltage coil and a secondary high voltage coil and to supply the resulting high voltage output to the anode of a cathode-ray tube through a rectification circuit, said high voltage generator comprising:

a tertiary coil magnetically coupled with said primary coil and adapted to produce an output voltage substantially corresponding to 1/n of the variation in the voltage of the high voltage when the high voltage output current of said secondary coil is varied to a maximum within a variable range;

a high voltage output variation detector circuit adapted to detect variations in the high voltage output to be supplied to the anode of said cathode-ray tube from said secondary coil;

a summing control circuit for controlling the rate of the output voltage to be additively supplied to said secondary coil from said tertiary coil, according to the variation detector signal from said high voltage output variation detector circuit; and a multiplying circuit for multiplying the voltage from said summing control circuit substantially by n-times and supplying the multiplied voltage to the low voltage end of said secondary coil.

2. The high voltage generator according to claim 1, wherein said summing control circuit is arranged to conduct no additive amount of the output voltage of said tertiary coil to said secondary coil when said high voltage output current is zero according to the variation detector signal from said high voltage output variation detector circuit, and to maximize the additive amount of the output voltage of said tertiary coil when said high voltage output current is at maximum.

3. The high voltage generator according to claim 1 or 2, wherein said summing control circuit comprises an error amplifier circuit adapted to produce an error signal by comparing a detection voltage from said high voltage output variation detector circuit with a reference voltage, a first transistor having the base thereof connected to the output of said error amplifier circuit and the emitter connected to a reference voltage line, and a second transistor having the collector thereof connected to the high voltage end of said tertiary coil, the emitter connected to the input terminal of said multiplying circuit and the base connected to the high voltage end of said tertiary coil through a resistor and to the collector of said first transistor.

4. The high voltage generator according to claim 1, wherein the output voltage of said multiplying circuit is supplied to the low voltage end of said secondary coil through a smoothing circuit.

5. The high voltage generator according to claim 1, wherein said high voltage output variation detector circuit is in the form of a resistor shunted from a high voltage cable supplying high voltage output to the anode of said cathode-ray tube.

6. The high voltage generator according to claim 1, wherein said high voltage output variation detector circuit is in the form of a resistor provided at the low voltage end of said tertiary coil.

7. The high voltage generator according to claim 1, wherein said tertiary coil is provided with an intermediate tap at a position for producing an output voltage substantially corresponding to 1/n of the variation in said high output voltage, supplying the output voltage of the intermediate tap to said summing control circuit.

8. The high voltage generator according to claim 7, wherein said summing control circuit comprises an error amplifier circuit adapted to produce an error signal by comparing a detection voltage from said high voltage output variation detector circuit with a reference voltage, a first transistor having the base thereof connected to the output of said error amplifier circuit and the emitter connected to the reference voltage line, and a second transistor having the collector thereof connected to said intermediate tap of said tertiary coil, the emitter connected to the input terminal of said multiplying circuit and the base connected to the high voltage end of said tertiary coil through a resistor and to the collector of said first transistor through a diode.

* * * * *